(12) United States Patent
Lawrenson et al.

(10) Patent No.: US 11,361,376 B2
(45) Date of Patent: Jun. 14, 2022

(54) INFORMATION PROCESSING APPARATUS AND METHOD FOR PROCESSING INFORMATION

(71) Applicant: SONY CORPORATION, Tokyo (JP)

(72) Inventors: Matthew Lawrenson, Bussigny (CH); Masaaki Isozu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/496,952

(22) PCT Filed: Jan. 18, 2018

(86) PCT No.: PCT/JP2018/001364
§ 371 (c)(1),
(2) Date: Sep. 23, 2019

(87) PCT Pub. No.: WO2018/179702
PCT Pub. Date: Oct. 4, 2018

(65) Prior Publication Data
US 2020/0104913 A1 Apr. 2, 2020

(30) Foreign Application Priority Data
Mar. 30, 2017 (JP) .............................. JP2017-067026

(51) Int. Cl.
*G06Q 40/04* (2012.01)
*G06Q 20/06* (2012.01)
(Continued)

(52) U.S. Cl.
CPC ............. *G06Q 40/04* (2013.01); *G06N 20/00* (2019.01); *G06Q 20/0655* (2013.01); *G06Q 20/3224* (2013.01); *G06Q 2220/00* (2013.01)

(58) Field of Classification Search
CPC ............... G06N 20/00; G06Q 30/0208; G06Q 2220/00; G06Q 50/20; G06Q 20/0655;
(Continued)

(56) References Cited

U.S. PATENT DOCUMENTS

2011/0251941 A1 10/2011 Dunwoody
2015/0261195 A1 9/2015 Kami
(Continued)

FOREIGN PATENT DOCUMENTS

JP 2002-132126 A 5/2002
JP 2003-076851 A 3/2003
(Continued)

OTHER PUBLICATIONS

Extended European Search Report of EP Application No. 18777773.5, dated Dec. 5, 2019, 07 pages.
(Continued)

*Primary Examiner* — Scott S Trotter
(74) *Attorney, Agent, or Firm* — Chip Law Group

(57) ABSTRACT

There is provided an information processing apparatus including a processor that determines, on the basis of a predetermined condition, a transaction between a first virtual asset granted on the basis of a learning unit being certified to a user being educated and a second virtual asset different from the first virtual asset.

12 Claims, 11 Drawing Sheets

(51) Int. Cl.
*G06Q 20/32* (2012.01)
*G06N 20/00* (2019.01)

(58) Field of Classification Search
CPC .... G06Q 40/06; G06Q 20/3224; G06Q 40/04;
H04L 2209/38
USPC .......................................................... 705/67
See application file for complete search history.

(56) References Cited

U.S. PATENT DOCUMENTS

2015/0324787 A1* 11/2015 Schaffner ........... G06Q 20/3825
705/67
2016/0330034 A1* 11/2016 Back ................... G06Q 20/065

FOREIGN PATENT DOCUMENTS

| JP | 2012-113445 A | 6/2012 | |
|---|---|---|---|
| JP | 2016-162431 A | 9/2016 | |
| WO | 2014/013889 A1 | 1/2014 | |
| WO | 2014/054612 A1 | 4/2014 | |
| WO | WO2015/143068 A1 * | 9/2015 | ............. G06Q 20/36 |

OTHER PUBLICATIONS

International Search Report and Written Opinion of PCT Application No. PCT/JP2018/001364, dated Apr. 3, 2018, 10 pages of ISRWO.
Office Action for EP Patent Application No. 18777773.5, dated Apr. 1, 2021, 04 pages of Office Action.

* cited by examiner

| USER ID | abc1234 |
|---|---|
| EDUCATIONAL COIN ID | defgh56789 |
| RELEVANT LEARNING UNIT | LEARNING UNIT A |
| RELEVANT TOPIC | TOPIC A<br>TOPIC B<br>TOPIC C |

FIG. 12

| | |
|---|---|
| USER ID | abc1234 |
| EDUCATIONAL COIN ID | defgh56789 |
| RELEVANT LEARNING UNIT | LEARNING UNIT A |
| RELEVANT TOPIC | TOPIC A<br>TOPIC B<br>TOPIC C |
| EXCHANGE COIN ID | a1b2c3d4e5 |
| EXCHANGE RATE | 2.0 |
| LOCATION INFORMATION | AREA A |
| PRODUCT/SERVICE INFORMATION | PRODUCT A |
| SALES ENTITY | COMPANY A |
| TRANSACTION ID | f6g7h8i9 |

INFORMATION PROCESSING APPARATUS AND METHOD FOR PROCESSING INFORMATION

CROSS REFERENCE TO RELATED APPLICATIONS

This application is a U.S. National Phase of International Patent Application No. PCT/JP2018/001364 filed on Jan. 18, 2018, which claims priority benefit of Japanese Patent Application No. JP 2017-067026 filed in the Japan Patent Office on Mar. 30, 2017. Each of the above-referenced applications is hereby incorporated herein by reference in its entirety.

TECHNICAL FIELD

The present disclosure relates to an information processing apparatus, and a method for processing information.

BACKGROUND ART

These days, transactions on virtual currency not issued by countries, such as Bitcoin, are being performed. Furthermore, in transactions on virtual currency, for example, in Bitcoin, transactions are managed using a blockchain that is distributed ledger technology.

Patent Document 1 discloses a system for exchanging virtual assets between different blockchains using side chains with respect to virtual assets managed by different blockchains, such as virtual currency. Furthermore, Patent Document 1 discloses that, when an asset managed by one blockchain is transferred to another blockchain, the asset is transferred at a predetermined exchange rate.

CITATION LIST

Patent Document

Patent Document 1: US Patent Application Laid-Open No. 2016/0330034

SUMMARY OF THE INVENTION

Problems to be Solved by the Invention

However, while Patent Document 1 discloses that exchange among a plurality of virtual assets is carried out on the basis of a predetermined exchange rate, it fails to disclose a transaction method using other virtual assets.

In view of the above, the present disclosure proposes an information processing apparatus and a method for processing information that enable flexible transactions using virtual assets.

Solutions to Problems

According to the present disclosure, there is provided an information processing apparatus including a processor that determines, on the basis of a predetermined condition, a transaction between a first virtual asset granted on the basis of a learning unit being certified to a user being educated and a second virtual asset different from the first virtual asset.

Furthermore, according to the present disclosure, there is provided a method for processing information that causes a computer to determine, on the basis of a predetermined condition, a transaction between a first virtual asset granted on the basis of a learning unit being certified to a user being educated and a second virtual asset different from the first virtual asset.

Effects of the Invention

According to the present disclosure, it becomes possible to perform flexible transactions using virtual assets.

Note that the effect described above is not necessarily limited, and any of the effects described in the present specification or another effect that can be understood from the present specification may be exerted in addition to the effect described above or instead of the effect described above.

BRIEF DESCRIPTION OF DRAWINGS

FIG. 12 is a table illustrating another example of the information managed by the blockchain system according to the embodiment of the present disclosure.

MODE FOR CARRYING OUT THE INVENTION

Hereinafter, a preferred embodiment of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Note that descriptions will be given in the following order.
0. Overview of Peer-to-Peer Database
1. Overview of Asset Management System
2. Configuration of Devices Included in Asset Management System
3. Method for Processing Information in Asset Management System
4. Exemplary Use Case of Asset Management System
5. Hardware Configuration of Issuance Server and Transaction Server
6. Supplementary Items
7. Conclusion

0. OVERVIEW OF PEER-TO-PEER DATABASE

An asset management system according to the present embodiment uses a distributed peer-to-peer database distributed in a peer-to-peer network. Note that the peer-to-peer network may be called a peer-to-peer distributed file system. Hereinafter, the peer-to-peer network may be referred to as a "P2P network", and the peer-to-peer database may be referred to as a "P2P database". As an example of the P2P database, blockchain data distributed in the P2P network may be used. In view of the above, a blockchain system will be described first.

Figure 1:
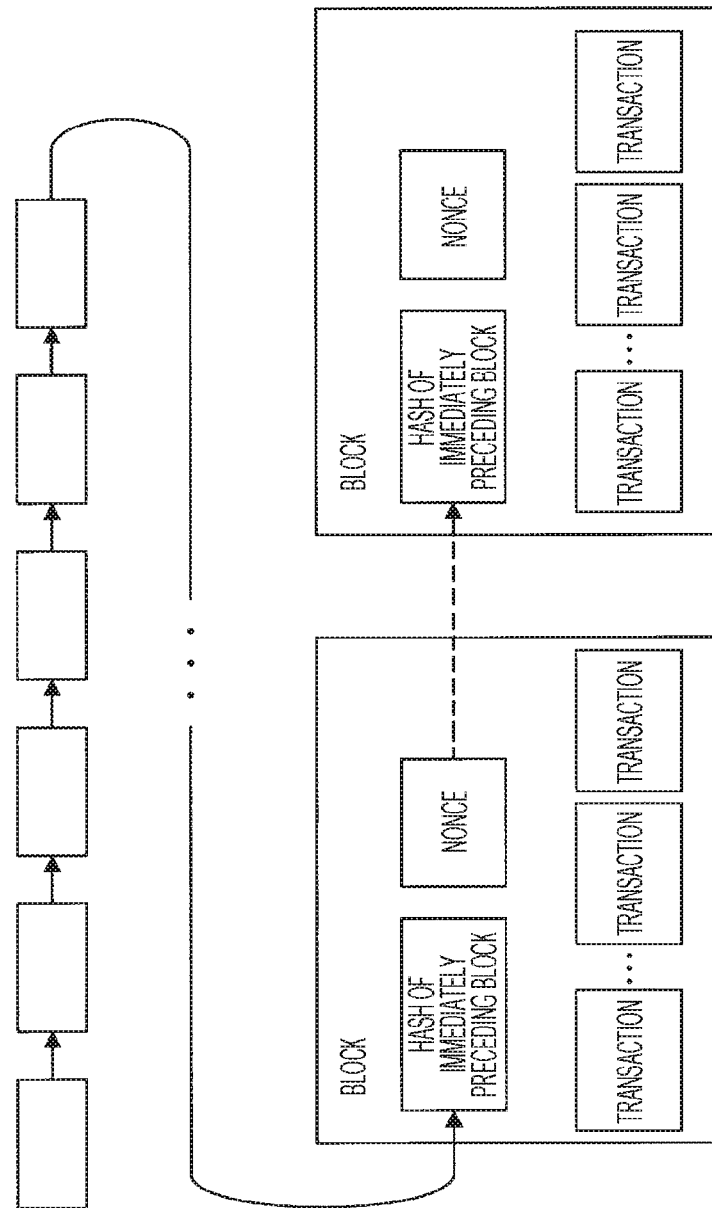
FIG. 1 is a diagram schematically illustrating a blockchain system according to an embodiment of the present disclosure.

As illustrated in FIG. 1, blockchain data according to the present embodiment is data including a plurality of blocks continuously arranged in chains. One or more target data can be stored in each block as a transaction.

Examples of the blockchain data according to the present embodiment include blockchain data used for exchange of data of virtual currency, such as Bitcoin. The blockchain data used for exchange of data of virtual currency includes, for example, a hash of the immediately preceding block, and a special value called a nonce. The hash of the immediately preceding block is used to determine whether or not it is a "correct block" in a correct sequence from the immediately preceding block. A nonce is used to prevent impersonation in authentication using a hash, and tampering is prevented by using the nonce. Examples of the nonce include data indicating a character string, a numerical string, or a combination thereof.

Furthermore, in the blockchain data, data of each transaction is subject to application of an electronic signature using an encryption key, or is encrypted using an encryption key. Furthermore, data of each transaction is published and shared across the entire P2P network. Note that, depending on the blockchain system, the same record may not necessarily be held in the entire P2P network.

Figure 2:
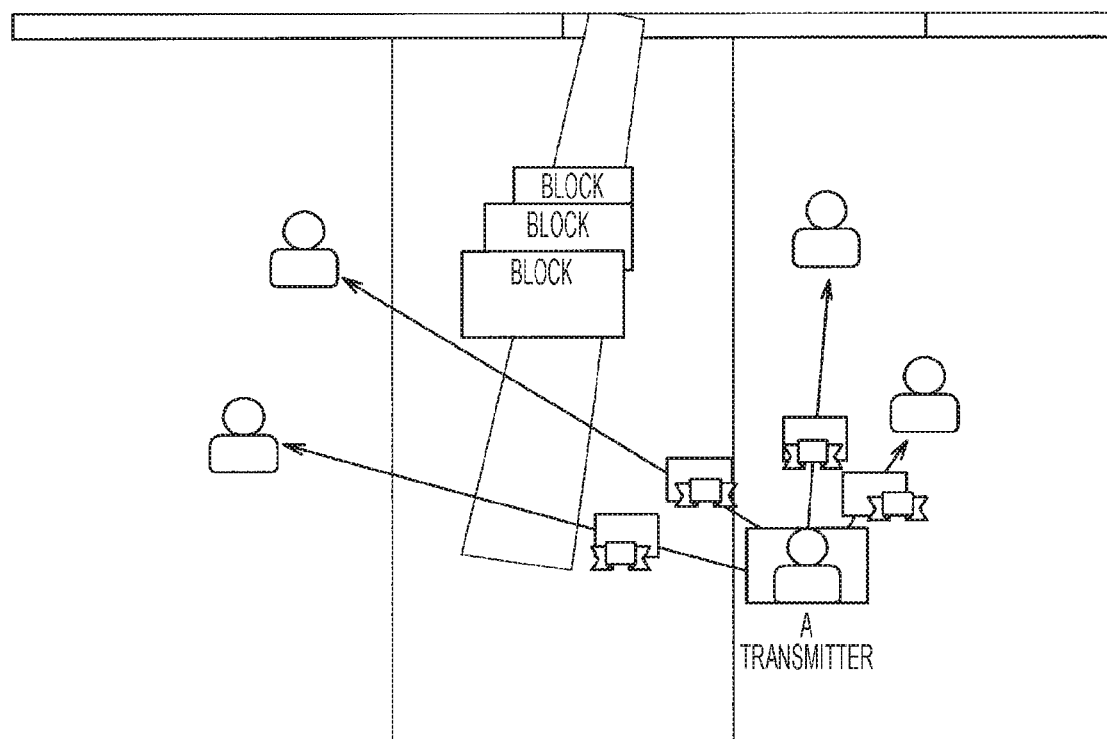
FIG. 2 is another diagram schematically illustrating the blockchain system according to the embodiment of the present disclosure.

FIG. 2 is a diagram illustrating how target data is registered by a user A in the blockchain system. The user A electronically signs the target data to be registered in the blockchain data using a private key of the user A. Then, the user A broadcasts the transaction including the electronically signed target data on the network. This ensures that the owner of the target data is the user A.

Figure 3:
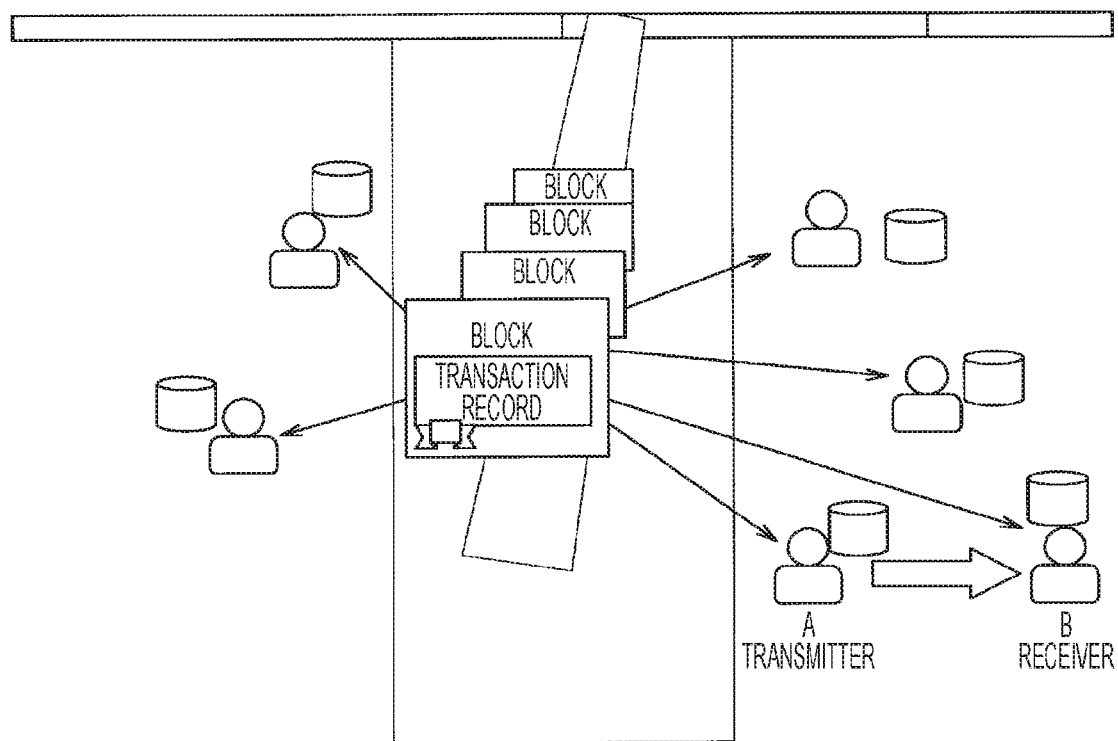
FIG. 3 is still another diagram schematically illustrating the blockchain system according to the embodiment of the present disclosure.

FIG. 3 is a diagram illustrating how the target data is migrated from the user A to a user B in the blockchain system. The user A electronically signs the transaction using the private key of the user A, and includes a public key of the user B in the transaction. This indicates that the target data has been migrated from the user A to the user B. Furthermore, upon the transaction of the target data, the user B may obtain a public key of the user A from the user A, and may obtain the electronically signed or encrypted target data.

Furthermore, in the blockchain system, by using a side chain technique, for example, it is possible to include, in the blockchain data used to exchange data of existing virtual currency such as the blockchain data of Bitcoin, other target data different from the virtual currency. Here, in the present embodiment, the other target data different from the virtual currency is information associated with a transaction using an educational coin (first virtual asset) or an exchange coin (second virtual asset) to be described later.

In this manner, with the blockchain data being used to manage the information associated with a virtual asset, the information associated with a virtual asset is held on the network without being tampered. Furthermore, with the blockchain data being used, a third party who wishes to use the information included in the blockchain can access the information included in the blockchain on the basis of predetermined authority. Note that the information associated with a virtual asset managed in the present embodiment will be described later.

1. OVERVIEW OF ASSET MANAGEMENT SYSTEM

The foregoing has described the blockchain system, which is an example of the P2P database used in the asset management system according to the embodiment of the present disclosure. Hereinafter, an overview of the asset management system according to the embodiment of the present disclosure will be described.

(1-1. Exemplary Use Case of Information Management System)

Figure 4:
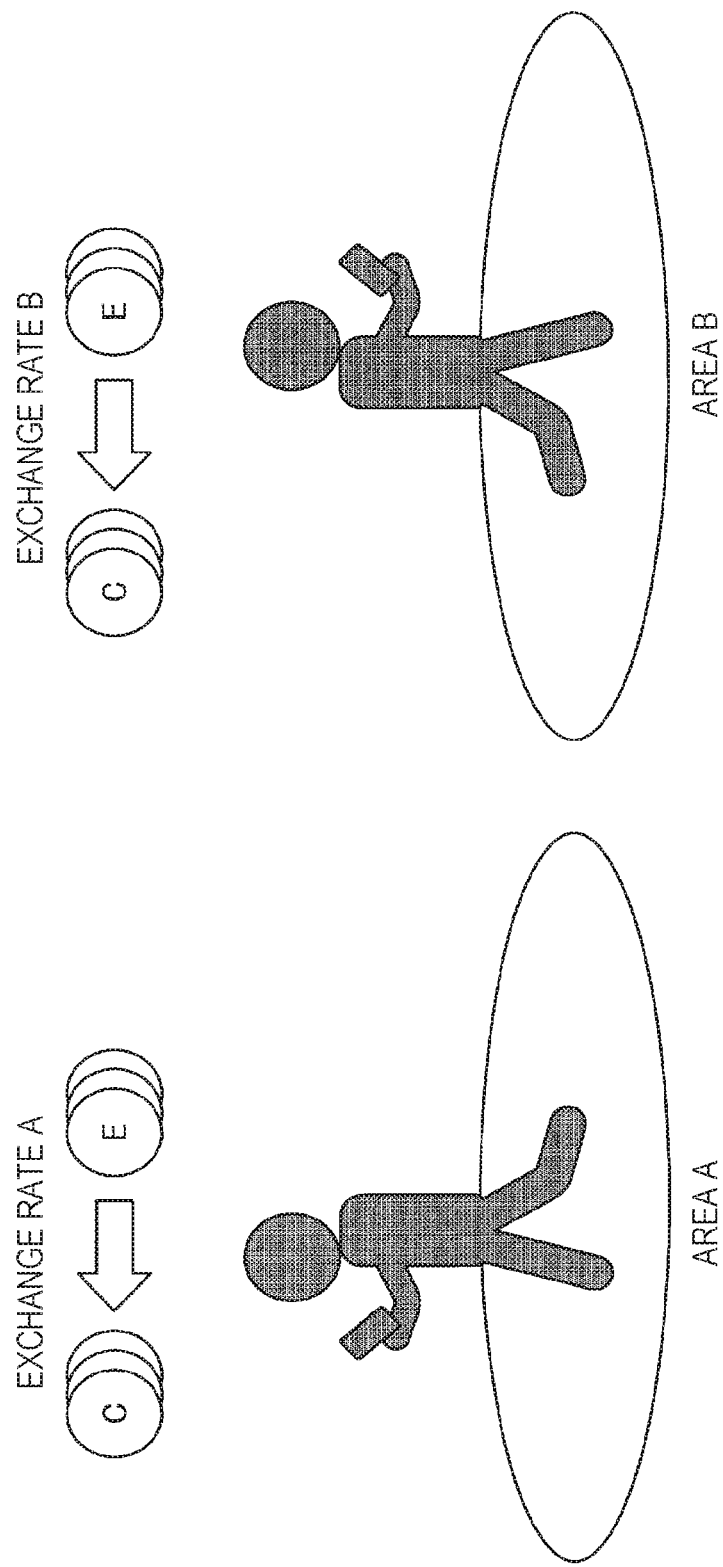
FIG. 4 is a diagram schematically illustrating an exemplary use case of an asset management system according to the embodiment of the present disclosure.

FIG. 4 is a diagram illustrating an exemplary use case in which the asset management system according to the present embodiment is used. In the asset management system according to the present embodiment, information associated with an educational coin, which is denoted by "E" in FIG. 4, and an exchange coin, which is denoted by "C" and is to be exchanged for the educational coin, is managed.

Here, the educational coin and the exchange coin are virtual assets. In the present specification, the virtual assets may indicate assets other than assets issued by countries (e.g., dollar, yen, etc.). Furthermore, in the present specification, the virtual assets may indicate assets that have no entity (e.g., coins and banknotes). Examples of the virtual assets include virtual currency such as Bitcoin. However, a virtual asset described herein does not necessarily have monetary value in the virtual asset itself, and the virtual asset may be exchanged for another virtual asset having monetary value.

Furthermore, the educational coin is a virtual asset issued in the case where a user has been educated at a predetermined institution, such as a school, and has received predetermined certification. For example, a school may issue an educational coin at the time of certifying a credit for the user. Then, the user who has received the credit obtains the issued educational coin.

The exchange coin is a virtual asset to be exchanged for the educational coin as described above. The exchange coin has monetary value, and may be used to purchase products, services, stocks, and the like. That is, the user may exchange the educational coin for the exchange coin, and may purchase products or services using the exchange coin. Note that an exchange coin is exchanged for an educational coin according to a predetermined condition. For example, an educational coin may be exchanged for an exchange coin at exchange rates different for each location. Specifically, as illustrated in FIG. 4, an educational coin is exchanged for an exchange coin at an exchange rate A in an area A. Furthermore, an educational coin is exchanged for an exchange coin at an exchange rate B in an area B. Note that the exchange rate is set to be different between the area A and the area B in the example above. However, the exchange rate in the area A or the area B may be the same as an exchange rate in another area.

Furthermore, an educational coin may be exchanged for an exchange coin at exchange rates different for each building. Specifically, an educational coin may be exchanged for an exchange coin at the exchange rate A in a building A. Furthermore, an educational coin may be exchanged for an exchange coin at the exchange rate B in a building B.

In this manner, in the asset management system according to the present embodiment, the method of exchange (exchange rate in FIG. 4) between the educational coin and the exchange coin may be different according to a predetermined condition (according to an area in FIG. 4). Therefore, groups or organizations in a predetermined area (e.g., company, store, and public organization) can motivate educated human resources to visit the area by flexibly setting a method of exchange between the educational coin and the exchange coin. Furthermore, with the exchange coin being used for payment of rent and the like in the area, the groups or organizations in the predetermined area can motivate the educated human resources to settle in the area. Note that the method of exchange between the educational coin and the exchange coin and the method of using the exchange coin will be described later.

(1-2. Configuration of Asset Management System) The foregoing has described the exemplary use case of the asset management system according to the embodiment of the present disclosure. Hereinafter, a configuration of the asset management system according to the embodiment of the present disclosure will be described.

Figure 5:
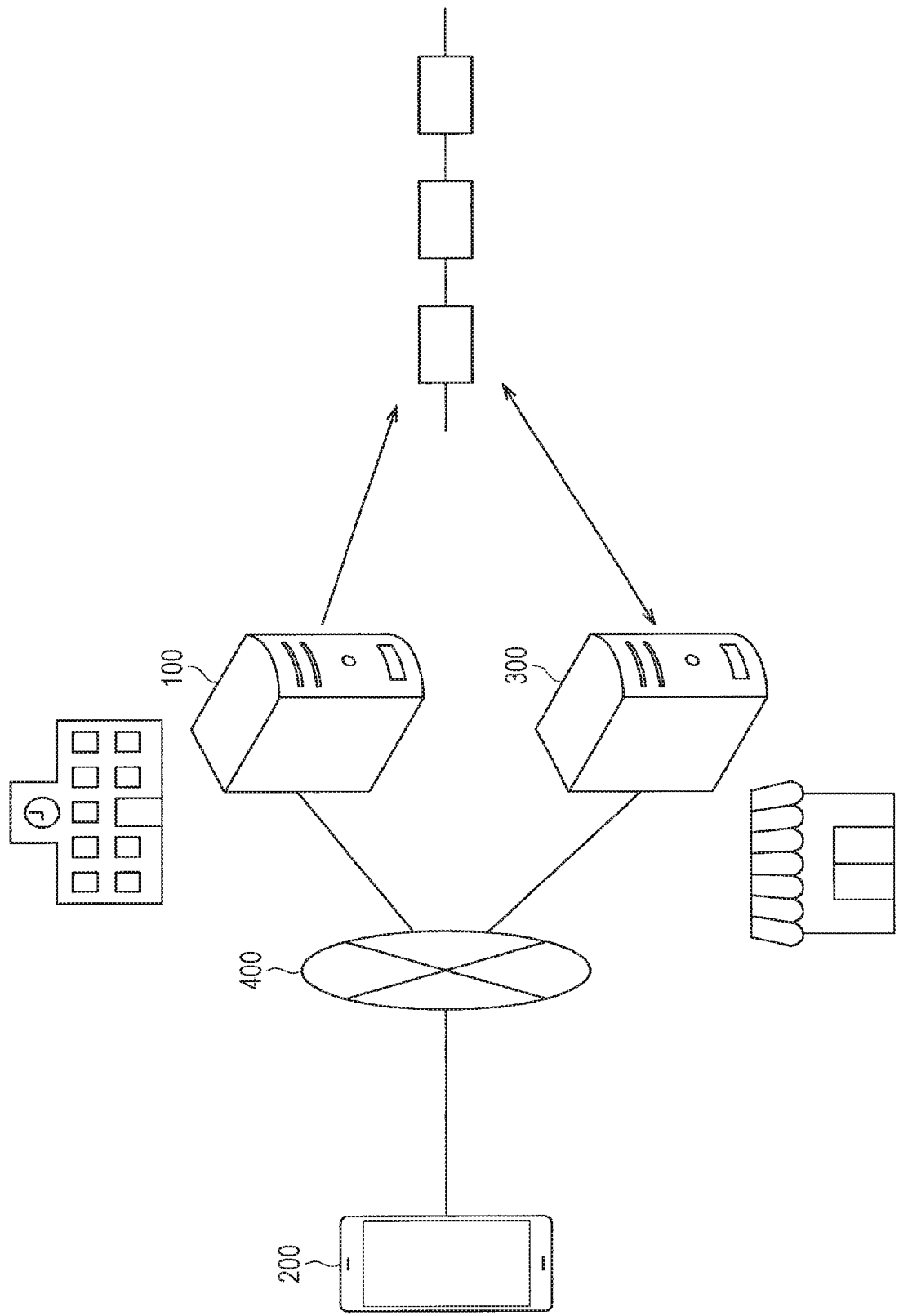
FIG. 5 is a diagram schematically illustrating a configuration of the asset management system according to the embodiment of the present disclosure.

FIG. 5 is a diagram illustrating the configuration of the asset management system according to the present embodiment. The asset management system according to the present embodiment includes an issuance server 100, a user device 200, a transaction server 300, and a network 400. Note that the issuance server 100, the user device 200, and the transaction server 300 are an example of an information processing apparatus that executes information processing according to the present embodiment.

The issuance server 100 is an information processing apparatus that issues the educational coin described above on the basis of a learning unit obtained by the user. Therefore, the issuance server 100 may perform processing of certifying the learning unit of the user. Furthermore, the issuance server 100 may be managed by, for example, an organization that certifies the learning unit, such as a school.

Here, the learning unit may be certified in a case where the user is educated at a predetermined institution, such as a school. Furthermore, the learning unit may be a learning unit designated by a curriculum or a syllabus of a predetermined institution, such as a school. For example, the learning unit may be certified in such a case where the user participates in a lecture for a predetermined period of time (e.g., ten hours) and gets a predetermined score in an examination. For example, the learning unit may include foreign languages, mathematics, chemistry, physics, laws, earth science, history, programming, cooking, engine control, mechanical engineering, meteorology, astronomy, animation, and the like. Furthermore, a topic related to the learning unit may be set in the learning unit. For example, in a case where the learning unit is cooking, the topic may be related to a type of cuisine, such as Japanese cuisine, Chinese cuisine, and a French cuisine. Furthermore, in a case where the learning unit is foreign languages, the topic may be related to a type of foreign languages, such as English, Chinese, and French. Accordingly, the topic may be a sub-category of the learning unit.

Furthermore, the issuance server 100 may issue an educational coin in association with the learning unit or the topic certified for the user. Then, the issuance server 100 may register information associated with the issued educational coin in the blockchain.

In this manner, with the information associated with the educational coin being managed by the blockchain, the information associated with the educational coin is held on the network without being tampered. Furthermore, a third party who wishes to use the information included in the blockchain can access the information included in the blockchain on the basis of predetermined authority.

The user device 200 is an information processing apparatus owned by the user. For example, the user device 200 may be an information processing apparatus such as a mobile phone, a tablet computer, a laptop computer, a desktop computer, a PDA, and an in-vehicle device.

The user may use the user device 200 to obtain the information associated with the educational coin from the blockchain. Then, the user transmits, to the transaction server 300, a transaction request for exchanging the educational coin for the exchange coin. Note that, at this time, the transaction request may include predetermined information (e.g., location information) used for a predetermined condition for exchanging the educational coin for the exchange coin. The predetermined condition here will be described later.

The transaction server 300 generates transaction information associated with the educational coin on the basis of the transaction request received from the user device 200. The transaction server 300 may be managed by, for example, a predetermined organization such as a store. Furthermore, the transaction server 300 may obtain the information associated with the educational coin from the blockchain on the basis of the transaction request from the user device 200. Then, the transaction server 300 generates transaction information associated with the educational coin on the basis of the obtained information associated with the educational coin, the received transaction request, and the predetermined condition. For example, the transaction server 300 generates transaction information for exchanging the educational coin for the exchange coin at the exchange rate based on the predetermined condition. Then, the transaction server 300 may register the transaction information in the blockchain.

In this manner, transactions related to the educational coin and the exchange coin are conducted, whereby, for example, an organization in an area (e.g., company, store, and public organization) can set a condition for conducting flexible transactions related to virtual assets to provide educated people with synchronization to visit the area.

Note that, in the example described above, the blockchain in which the information associated with the educational coin is registered is the same as the blockchain in which the transaction information is registered. However, the blockchain in which the information associated with the educational coin is registered may be different from the blockchain in which the transaction information is registered.

2. CONFIGURATION OF DEVICES INCLUDED IN ASSET MANAGEMENT System

The foregoing has described the overview of the asset management system according to the embodiment of the present disclosure. Hereinafter, configurations of devices included in the asset management system according to the embodiment of the present disclosure will be described.

(2-1. Configuration of Issuance Server 100)

Figure 6:
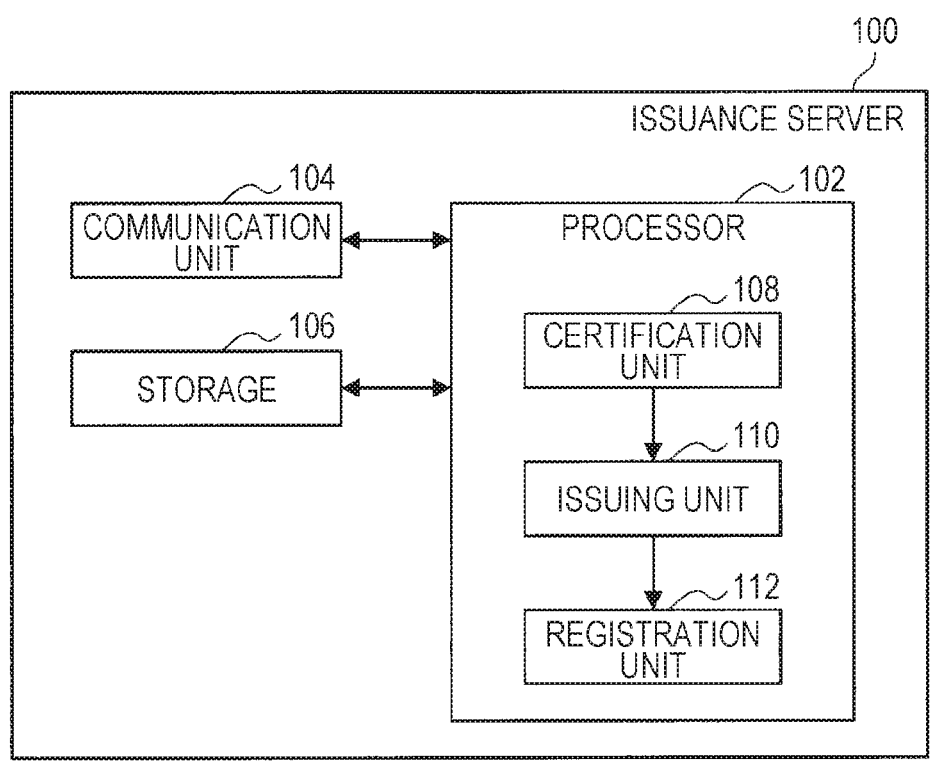
FIG. 6 is a block diagram illustrating an exemplary functional configuration of an issuance server according to the embodiment of the present disclosure.

FIG. 6 is a diagram illustrating an exemplary configuration of the issuance server 100 according to the present embodiment. The issuance server 100 includes, for example, a processor 102, a communication unit 104, and a storage 106. Furthermore, the processor 102 includes a certification unit 108, an issuing unit 110, and a registration unit 112.

The processor 102 processes signals from each component of the issuance server 100. For example, the processor 102 decodes the signals transmitted from the communication unit 104, and extracts data. In addition, the processor 102 may also read data from the storage 106 to perform processing on the read data.

The communication unit 104 is a communication unit that communicates with an external device by wired communication or wireless communication, which may perform communication using, for example, a communication scheme in conformity with Ethernet (registered trademark). The storage 106 stores various kinds of data used by the processor 102.

The certification unit 108 certifies a learning unit designated by a curriculum, a syllabus, or the like defined by a predetermined organization such as a school. The issuing unit 110 issues an educational coin on the basis of the learning unit certified by the certification unit 108. Here, the issuing unit 110 may issue the educational coin in association with the certified learning unit or a topic related to the learning unit.

The registration unit 112 registers information associated with the issued educational coin in blockchain data that is an example of the P2P database. As will be described later with reference to FIG. 10, the information associated with the educational coin may include, for example, any one of pieces of information associated with a user ID, an educational coin ID, a learning unit, and a topic.

(2-2. Configuration of User Device 200)

Figure 7:
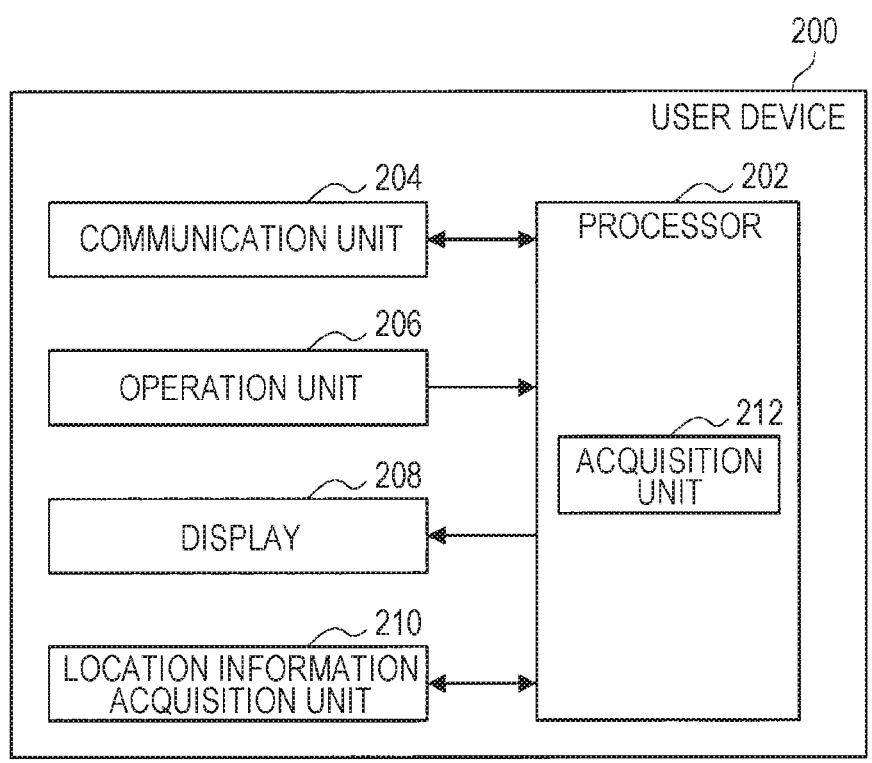
FIG. 7 is a block diagram illustrating an exemplary functional configuration of a user device according to the embodiment of the present disclosure.

FIG. 7 is a diagram illustrating an exemplary configuration of the user device 200 according to the present embodiment. The user device 200 includes, for example, a processor 202, a communication unit 204, an operation unit 206, a display 208, and a location information acquisition unit 210. Furthermore, the processor 202 includes an acquisition unit 212.

The processor 202 processes signals from each component of the user device 200. For example, the processor 202 decodes the signals transmitted from the communication unit 204, and extracts data. In addition, the processor 202 may process signals from the operation unit 206 to issue an instruction directed to an application to be executed in the processor 202.

The communication unit 204 is a communication unit for connecting the user device 200 and an external network by wired communication or wireless communication. For example, the communication unit 204 may perform communication using, for example, a communication scheme defined by the third generation partnership project (3GPP) or 3GPP2. Furthermore, the communication unit 204 may perform communication using a communication scheme such as W-CDMA, LTE, and CDMA2000. Note that the communication schemes mentioned above are examples, and the communication scheme of the communication unit 204 is not limited thereto.

The operation unit 206 receives operation on the user device 200 made by the user. The user operates the operation unit 206 to operate the application executed by the user device 200, for example. In addition, the user operates the operation unit 206 to set various functions of the user device 200.

The display 208 is used to display an image. For example, the display 208 displays an image associated with the application executed by the user device 200.

The location information acquisition unit 210 obtains the location of the user device 200. The location information acquisition unit 210 may obtain the location of the user device 200 using, for example, a global navigation satellite system (GNSS). Further, the location information acquisition unit 210 may obtain the location of the user device 200 on the basis of information from a base station of a cellular communication network.

The acquisition unit 212 obtains information associated with the educational coin from the blockchain via the communication unit 204. That is, the acquisition unit 212 obtains information associated with the educational coin of the user registered in the blockchain by the issuance server 100.

(2-3. Configuration of Transaction Server 300)

The foregoing has described the configuration of the user device 200 according to the embodiment of the present disclosure. Hereinafter, a configuration of the transaction server 300 according to the embodiment of the present disclosure will be described.

Figure 8:
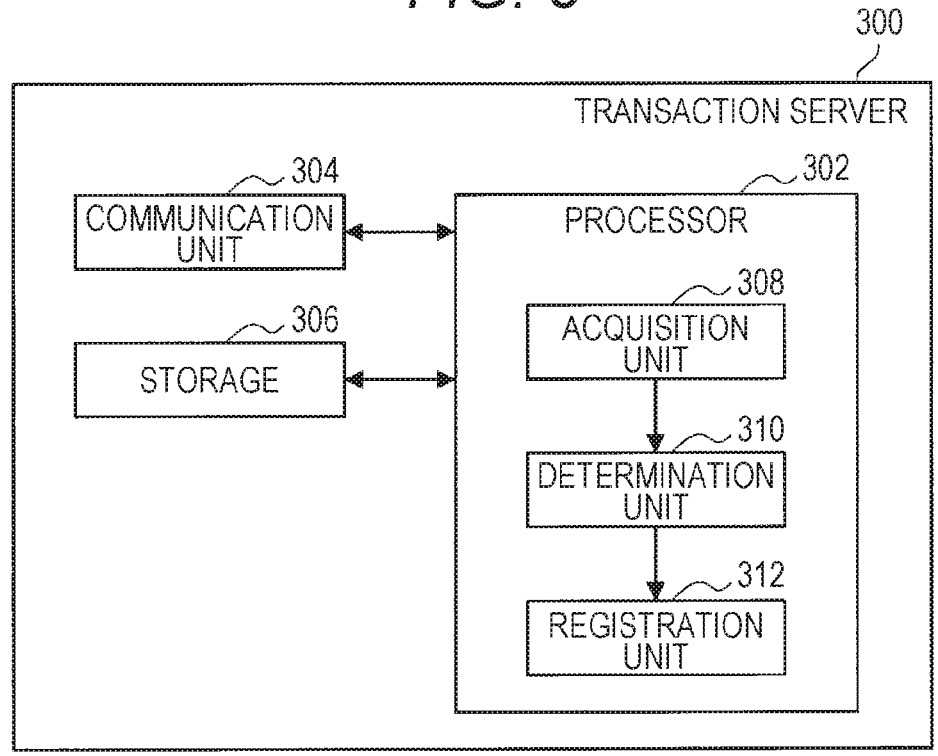
FIG. 8 is a block diagram illustrating an exemplary functional configuration of a transaction server according to the embodiment of the present disclosure.

FIG. 8 is a diagram illustrating an exemplary configuration of the transaction server 300 capable of performing processing of a method for processing information according to the present embodiment. The transaction server 300 includes, for example, a processor 302, a communication unit 304, and a storage 306. Furthermore, the processor 302 includes an acquisition unit 308, a determiner 310, and a registration unit 312.

The processor 302 processes signals from each component of the transaction server 300. For example, the processor 302 decodes the signals transmitted from the communication unit 304, and extracts data. In addition, the processor 302 reads data from the storage 306 to perform processing on the read data.

The communication unit 304 is a communication unit that communicates with an external device by wired communication or wireless communication, which may perform communication using, for example, a communication scheme in conformity with Ethernet (registered trademark). The storage 306 stores various kinds of data used by the processor 302.

The acquisition unit 308 obtains various kinds of data via the communication unit 304. For example, the acquisition unit 308 may obtain information associated with the educational coin from the user device 200. Furthermore, the acquisition unit 308 may obtain the information associated with the educational coin from the blockchain. Furthermore, the acquisition unit 308 may obtain predetermined information used for determination of a transaction from the user device 200.

The determiner 310 makes determination related to a transaction on the basis of a transaction request from the user device 200 and a predetermined condition. For example, the determiner 310 conducts a transaction for exchanging the educational coin for the exchange coin on the basis of the information associated with the educational coin and a predetermined condition. At this time, the determiner 310 may use, for example, location information obtained from the user device 200 to determine the predetermined condition.

The registration unit 312 registers information associated with the transaction generated by the determiner 310 in blockchain data that is an example of the P2P database. As will be described later with reference to FIG. 12, the information associated with the transaction may include, for example, any one of pieces of information associated with a user ID, an educational coin ID, a learning unit, a topic, an exchange coin ID, an exchange rate, location information, a product/service, a sales entity, and a transaction ID.

3. METHOD FOR PROCESSING INFORMATION IN ASSET MANAGEMENT SYSTEM

The foregoing has described the configuration of each of the devices included in the asset management system according to the embodiment of the present disclosure. Hereinafter, a method for processing information in the asset management system according to the embodiment of the present disclosure will be described.

(3-1. Method for Processing Information Related to Issuance of Educational Coin)

Figure 9:
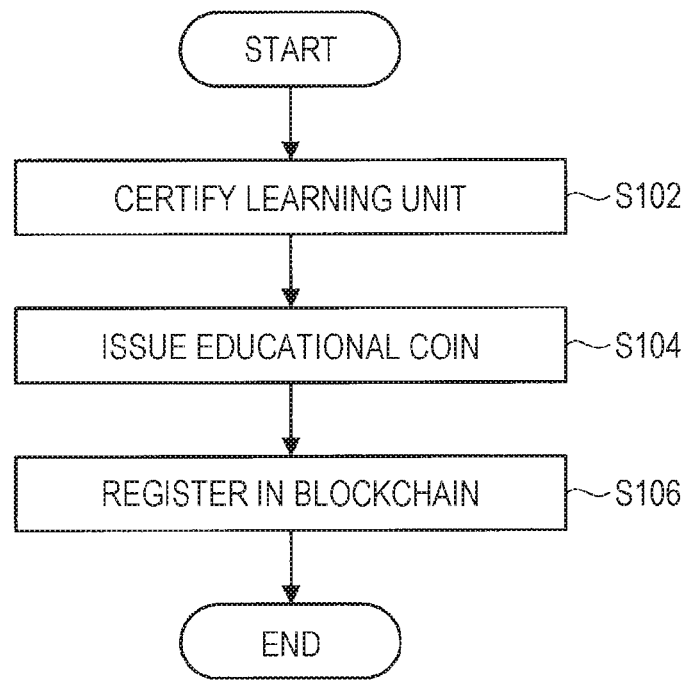
FIG. 9 is a flowchart illustrating an exemplary method for processing information according to the embodiment of the present disclosure.

FIG. 9 is a flowchart illustrating an example of the method for processing information executed in the asset management system according to the present embodiment. In particular, FIG. 9 illustrates the method for processing information related to issuance of the educational coin executed in the issuance server 100.

In S102, the certification unit 108 certifies a learning unit of the user. Here, the learning unit may be certified on the basis of the method designated by a curriculum, a syllabus, or the like defined by a predetermined organization such as a school, as described above. For example, the learning unit may be certified in such a case where the user participates in a lecture for a predetermined period of time (e.g., ten hours) and then takes a predetermined examination. Furthermore, the learning unit may be certified in such a case where the user gets a score equal to or more than a predetermined score in the examination.

Next, in S104, the issuing unit 110 issues an educational coin on the basis of the certification of the learning unit. As described above, the issuing unit 110 may issue the educational coin in association with the learning unit. Furthermore, the issuing unit 110 may issue the educational coin in association with a topic related to the learning unit.

Furthermore, the issuing unit 110 may issue the educational coin on the basis of a grade of the user at the time of certifying the learning unit mentioned above. For example, the issuing unit 110 may issue more educational coins to the user as the grade of the user is better. Specifically, the issuing unit 110 may issue more educational coins as the score of the examination is higher.

Figures 10, 11:
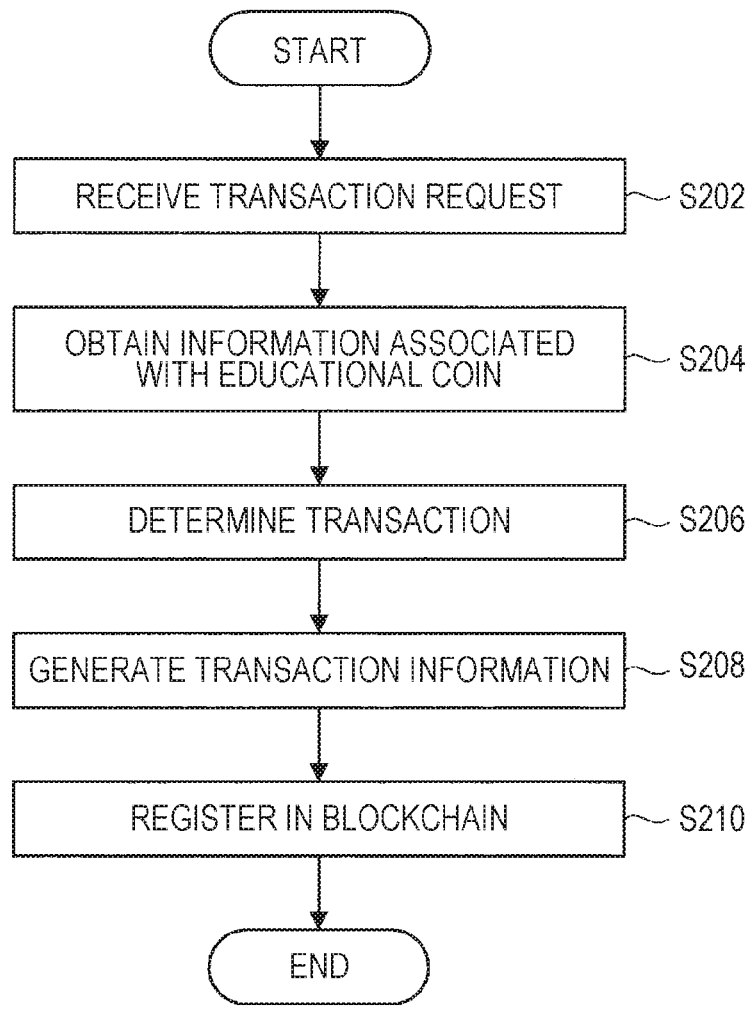
FIG. 10 is a table illustrating exemplary information managed by a blockchain system according to the embodiment of the present disclosure.
FIG. 11 is a flowchart illustrating another exemplary method for processing information according to the embodiment of the present disclosure.

Next, in S106, the registration unit 112 registers the information associated with the issued educational coin in the blockchain. FIG. 10 is a diagram illustrating an example of the information associated with the educational coin to be registered in the blockchain at this time.

As illustrated in FIG. 10, the information associated with the educational coin may include, for example, any one of pieces of information associated with a user ID, an educational coin ID, a learning unit, and a topic. Here, the user ID is identification information used to identify the user. Furthermore, the educational coin ID is identification information used to identify the educational coin.

Furthermore, the information associated with a learning unit is information indicating a type of the learning unit certified for the user. Furthermore, the information associated with a topic is information indicating a topic related to the certified learning unit. As illustrated in FIG. 10, those pieces of information associated with a learning unit and information associated with a topic may be managed in association with the issued educational coin. This is because, as will be described later, a predetermined condition related to a transaction may be determined on the basis of the information associated with a learning unit and the information associated with a topic. In this manner, the information associated with a learning unit and the information associated with a topic are used in a predetermined condition related to a transaction, whereby, for example, predetermined groups or organizations can set a condition related to a transaction to attract people who have received specific education or people having specific knowledge.

(3-2. Method for Processing Information Related to Transaction Based on Asset Management System)

The foregoing has described the method for processing information related to issuance of the educational coin executed in the issuance server 100. Hereinafter, a method for processing information related to a transaction executed in the transaction server 300 will be described.

FIG. 11 is a flowchart illustrating the method for processing information related to a transaction, which is executed in the transaction server 300. In S202, the transaction server 300 receives a transaction request from the user device 200. Here, the transaction request received by the transaction server 300 may be, for example, a request to exchange the educational coin for the exchange coin.

In S204, the acquisition unit 308 obtains information associated with the educational coin. The information associated with the educational coin may be obtained from the user device 200 together with the transaction request received in S202, for example. Furthermore, the acquisition unit 308 may obtain the information associated with the educational coin from the blockchain. As illustrated in FIG. 10, the information associated with the educational coin obtained here may include information associated with a user ID, an educational coin ID, a learning unit, and a topic.

In S206, the determiner 310 determines the transaction requested by the user device 200 on the basis of the transaction request, the information associated with the educational coin, and a predetermined condition. For example, the determiner 310 may determine the exchange rate between the educational coin and the exchange coin.

In a case where the determiner 310 determines the exchange rate between the educational coin and the exchange coin regarding the transaction, the determiner 310 may determine the exchange rate on the basis of location information obtained from the user device 200. Note that the location information may be received together with the transaction request received in S202.

For example, in a case where the exchange rate to be set differs depending on the location (e.g., area), the determiner 310 may store the exchange rate for each location in the storage 306 in advance, and may obtain the exchange rate from the storage 306. Furthermore, the acquisition unit 308 may obtain the exchange rate for each location from the blockchain. Furthermore, the acquisition unit 308 may obtain the exchange rate for each location from another information processing apparatus.

Then, the determiner 310 determines exchange between the educational coin and the exchange coin on the basis of the obtained location information and the exchange rate. For example, in a case where the location information indicates the area A and the exchange rate in the area A is 2.0, the determiner 310 determines to exchange the educational coin for the exchange coin at the exchange rate 2.0. Furthermore, in a case where the location information indicates the area B and the exchange rate in the area B is 1.0, the determiner 310 determines to exchange the educational coin for the exchange coin at the exchange rate 1.0.

In this manner, different exchange rates are set depending on the area, whereby an organization in an area (e.g., company, store, and public organization) can motivate educated human resources to visit the area.

Furthermore, in a case where the determiner 310 determines the exchange rate between the educational coin and the exchange coin regarding the transaction, the determiner 310 may determine the exchange rate on the basis of the information associated with the educational coin to be obtained.

For example, in a case where the exchange rate to be set differs depending on the learning unit or the topic related to the learning unit in a predetermined area, the determiner 310 may store the exchange rate for each learning unit or topic in the storage 306 in advance, and may obtain the exchange rate from the storage 306. Furthermore, the acquisition unit 308 may obtain the exchange rate from the blockchain. Furthermore, the acquisition unit 308 may obtain the exchange rate from another information processing apparatus.

Then, the determiner 310 determines exchange between the educational coin and the exchange coin on the basis of the obtained learning unit or the topic related to the learning unit and the exchange rate. For example, in a case where the learning unit is a foreign language and the exchange rate in the learning unit of the foreign language is 2.0, the determiner 310 determines to exchange the educational coin for the exchange coin at the exchange rate 2.0. Furthermore, in a case where the learning unit is laws and the exchange rate in the learning unit of the laws is 1.0, the determiner 310 determines to exchange the educational coin for the exchange coin at the exchange rate 1.0.

Furthermore, for example, in a case where the topic is English and the exchange rate for the English topic is 2.0, the determiner 310 determines to exchange the educational coin for the exchange coin at the exchange rate 2.0. Furthermore, in a case where the topic is French and the exchange rate for the French topic is 1.0, the determiner 310 determines to exchange the educational coin for the exchange coin at the exchange rate 1.0.

In this manner, different exchange rates are set depending on the learning unit or the topic, whereby an area requiring human resources having received predetermined education can motivate people having received the predetermined education to visit the area.

Furthermore, the determiner 310 may determine conditions related to a transaction other than the exchange rate. For example, in a case where the user exchanges the educational coin for the exchange coin to purchase a product or service, the determiner 310 may determine a condition related to the product or service.

For example, the determiner 310 may determine relevance between the product or service that the user wishes to purchase and the learning unit or topic associated with the educational coin. For example, in a case where the learning unit indicates a foreign language and the product to be purchased by the user is a dictionary of a foreign language, the determiner 310 may determine the relevance between the learning unit and the product to be purchased. That is, the determiner 310 may determine that the dictionary of a foreign language is related to the learning unit of a foreign language. Accordingly, the determiner 310 may determine to permit the transaction and to exchange the educational coin for the exchange coin.

Meanwhile, in a case where the learning unit indicates a foreign language and the product to be purchased by the user is a musical instrument, the determiner 310 may determine that the musical instrument is not related to the learning unit of a foreign language. Accordingly, the determiner 310 may determine not to permit the transaction and not to exchange the educational coin for the exchange coin.

Furthermore, in a case where the topic indicates English and the product to be purchased by the user is an English dictionary, the determiner 310 may determine that the English dictionary is related to the English topic. Accordingly, the determiner 310 may determine to permit the transaction and to exchange the educational coin for the exchange coin. Meanwhile, in a case where the topic indicates French and the product to be purchased by the user is an English dictionary, the determiner 310 may determine that the English dictionary is not related to the French topic. Accordingly, the determiner 310 may determine not to permit the transaction and not to exchange the educational coin for the exchange coin.

In this manner, it is determined whether or not to permit a transaction on the basis of relevance between the learning unit or topic and the product or service to be purchased, whereby the user having received predetermined education can be motivated to purchase a product or service useful for the user.

Note that, in the example described above, the exchange rate from the educational coin to the exchange coin may be determined instead of determining whether or not to permit the transaction. For example, in a case where there is relevance between the learning unit and the product to be purchased, the determiner 310 may determine that the exchange rate from the educational coin to the exchange coin is 2.0. On the other hand, in a case where there is no relevance between the learning unit and the product to be purchased, the determiner 310 may determine that the exchange rate from the educational coin to the exchange coin is 1.0. Such a method can also motivate the user having received predetermined education to purchase a product or service useful for the user.

Furthermore, in a case where the user exchanges the educational coin for the exchange coin to purchase a product or service, the determiner 310 may determine a condition related to a sales entity (e.g., company) of the product or service.

For example, in a case where the sales entity of the product to be purchased by the user is a predetermined specific sales entity (e.g., company A), the determiner 310 may determine to permit the transaction and to exchange the educational coin for the exchange coin. Meanwhile, in a case where the sales entity of the product to be purchased by the user is a sales entity (e.g., company B) other than the specific sales entity, the determiner 310 may determine not to permit the transaction and not to exchange the educational coin for the exchange coin.

Furthermore, the determiner 310 may determine the exchange rate from the educational coin to the exchange coin on the basis of the sales entity of the product to be purchased by the user. For example, in a case where the sales entity of the product to be purchased by the user is the predetermined specific sales entity (e.g., company A), the determiner 310 may determine that the exchange rate is 2.0. Meanwhile, in a case where the sales entity of the product to be purchased by the user is a sales entity (e.g., company B) other than the specific sales entity, the determiner 310 may determine that the exchange rate is 1.0.

In this manner, a transaction is determined on the basis of the sales entity of the product to be purchased by the user, whereby a specific sales entity can motivate the user having the educational coin to purchase a product or service sold by the sales entity.

As described above, in S206, the determiner 310 determines a transaction. When the determiner 310 determines a condition of the transaction in S206, the process proceeds to 208. In S208, the determiner 310 generates transaction information on the basis of the condition of the transaction determined in S206. Then, in S210, the registration unit 312 registers the generated transaction information in the blockchain.

Here, the transaction information may include information as illustrated in FIG. 12. FIG. 12 is a table illustrating information included in the transaction information. As illustrated in FIG. 12, the transaction information may include information associated with a user ID, an educational coin ID, a learning unit, a topic, an exchange coin ID, an exchange rate, location information, a product or service, a sales entity, and a transaction ID.

Here, the exchange rate indicates the exchange rate determined in S206 of FIG. 11. Furthermore, the information associated with location information, a product or service, and a sales entity may be obtained from the user device 200 together with the transaction request obtained in S202 of FIG. 11.

Furthermore, in registration of the transaction information in the blockchain, the user may electronically sign. Furthermore, in registration of the transaction information in the blockchain, an issuing entity of the exchange coin (e.g., operation entity of the asset management system) may electronically sign.

Furthermore, in a case where the user purchases a product or the like in the transaction, with the transaction information being registered in the blockchain, the exchange coin converted from the educational coin may move to the sales entity that sells the product. With the transaction information being processed in this manner, information associated with the transaction is held on the network without being tampered.

Note that, in the example described above, the educational coin has no monetary value, and the educational coin is exchanged for the exchange coin having monetary value. However, the educational coin may have monetary value. In that case, the educational coin may be used to purchase a specific product or service. That is, as described above, the educational coin may be used to purchase the product or service related to the learning unit or the topic associated with the educational coin.

Furthermore, the educational coin may be exchanged for an exchange coin used for a specific application purpose. For example, the educational coin may be exchanged for an exchange coin for buying/selling stocks. Furthermore, the educational coin may be exchanged for an exchange coin used for payment of rent.

4. EXEMPLARY USE CASE OF ASSET MANAGEMENT SYSTEM

The foregoing has described the asset management system and the method for processing information executed in the asset management system according to the present embodiment. Hereinafter, an exemplary use case of the asset management system according to the present embodiment will be described.

(4-1. Example in which Exchange Rate Differs Depending on Area)

First, an exemplary case where, as described above, the exchange rate differs depending on the area will be described in detail. For example, a public organization A in the area A that requires educated human resources sets a conversion rate from the educational coin to the exchange coin to 2.0. Note that the exchange rate in other areas is assumed to be 1.0.

In that case, a user having received predetermined education and having the educational coin wishes to go to the area A where a higher conversion rate is set and to convert the educational coin into the exchange coin in the area A. For example, in order to purchase a product in the area A using the exchange coin, the user goes to the area A and transmits a transaction request to the transaction server 300 using the user device 200 to purchase the product in a store in the area A. At this time, the user device 200 may transmits location information together with the transaction request. Note that the user may obtain, using the user device 200, information associated with the educational coin from the blockchain to transmit the information associated with the educational coin to the transaction server 300. Furthermore, the user device 200 may transmit, to the transaction server 300, information associated with the product that the user wishes to purchase and information associated with a sales entity of the product.

The transaction server 300 that has received the transaction request generates transaction information for exchanging the educational coin for the exchange coin at the exchange rate 2.0 on the basis of the location information. Then, the transaction server 300 registers the transaction information in the blockchain. At this time, the transaction server 300 may obtain the information associated with the sales entity of the product and the information associated with a price of the product from the user device 200, and may further include, in the transaction information, information for transferring the exchange coin corresponding to the price of the product to the sales entity. As a result, the exchange coin corresponding to the price of the product is transferred to the sales entity of the product.

In this manner, different exchange rates are set depending on the area, whereby an area requiring educated human resources can motivate the human resources to visit the area.

(4-2. Example of Determining Relevance between Learning Unit or Topic and Product etc.)

Next, a use case in which relevance between a learning unit or topic and a product or the like is determined will be described. For example, a group or organization that wishes to increase the number of human resources having received predetermined education performs setting to make it possible to purchase a product related to specific education using the exchange coin. Note that an exemplary case where it is desired to increase the number of human resources having received education related to English will be described hereinafter. Accordingly, the specific education mentioned above is the education related to English, and the product related to the specific education is a product related to English. Furthermore, the group or organization that wishes to increase the number of human resources having received the specific education may be, for example, a group promoting the spread of English, or may be a country.

In this case, a user having received the education related to English and having the educational coin associated with the English topic wishes to convert the educational coin into the exchange coin to purchase a specific product that can be purchased by the exchange coin. For example, a user having received the education related to English wishes to purchase, as a product related to English, an English dictionary using the exchange coin. Accordingly, the user transmits a transaction request for purchasing the English dictionary to the transaction server 300 using the user device 200. At this time, the user device 200 transmits information associated with the product together with the transaction request. Note that the user may obtain, using the user device 200, information associated with the educational coin from the blockchain to transmit the information associated with the educational coin to the transaction server 300.

The transaction server 300 that has received the transaction request determines whether or not the transaction is permissible on the basis of the information associated with the topic in association with the educational coin and the information associated with the product. That is, the relevance between the topic in association with the educational coin and the product is determined. Here, the topic is English, and the product is an English dictionary, whereby the relevance is determined. Accordingly, the transaction server 300 generates transaction information for exchanging the educational coin into the exchange coin. Then, the transaction server 300 registers the transaction information in the blockchain. At this time, as described above, the transaction server 300 may obtain the information associated with the sales entity of the product and the information associated with the price of the product from the user device 200, and may further include, in the transaction information, information for transferring the exchange coin corresponding to the price of the product to the sales entity. As a result, the exchange coin corresponding to the price of the product is transferred to the sales entity of the product.

In this manner, it is determined whether or not the transaction is permissible on the basis of the relevance between the learning unit or topic and the product or the like, whereby groups or organizations that wish to increase the number of human resources having received specific education can motivate the human resources to receive higher education.

(4-3. Example of Converting Educational Coin into Exchange Coin for Specific Application Purpose)

Next, a use case in which the educational coin is converted into the exchange coin for a specific application purpose will be described. For example, groups or organizations that wish to expand the market perform setting such that the educational coin can be converted into the exchange coin for the specific application purpose. Note that an exemplary case where the specific application purpose is purchase of stocks will be described hereinafter.

In this case, a user who holds the educational coin wishes to convert the educational coin into the exchange coin to purchase a stock using the exchange coin. Accordingly, the user transmits a transaction request for purchasing the stock to the transaction server 300 using the user device 200. The transaction server 300 that has received the transaction request generates transaction information for exchanging the educational coin for the exchange coin that can purchase the stock. Then, the transaction server 300 registers the transaction information in the blockchain.

In this manner, the educational coin is converted into the exchange coin for a specific application purpose, whereby groups or organizations that wish to expand a specific market can motivate educated human resources to join the market.

5. HARDWARE CONFIGURATION OF ISSUANCE SERVER AND TRANSACTION SERVER

The foregoing has described the use cases of the asset management system according to the present embodiment. Hereinafter, hardware configurations of the issuance server 100 and the transaction server 300 in the asset management system will be described.

Figure 13:
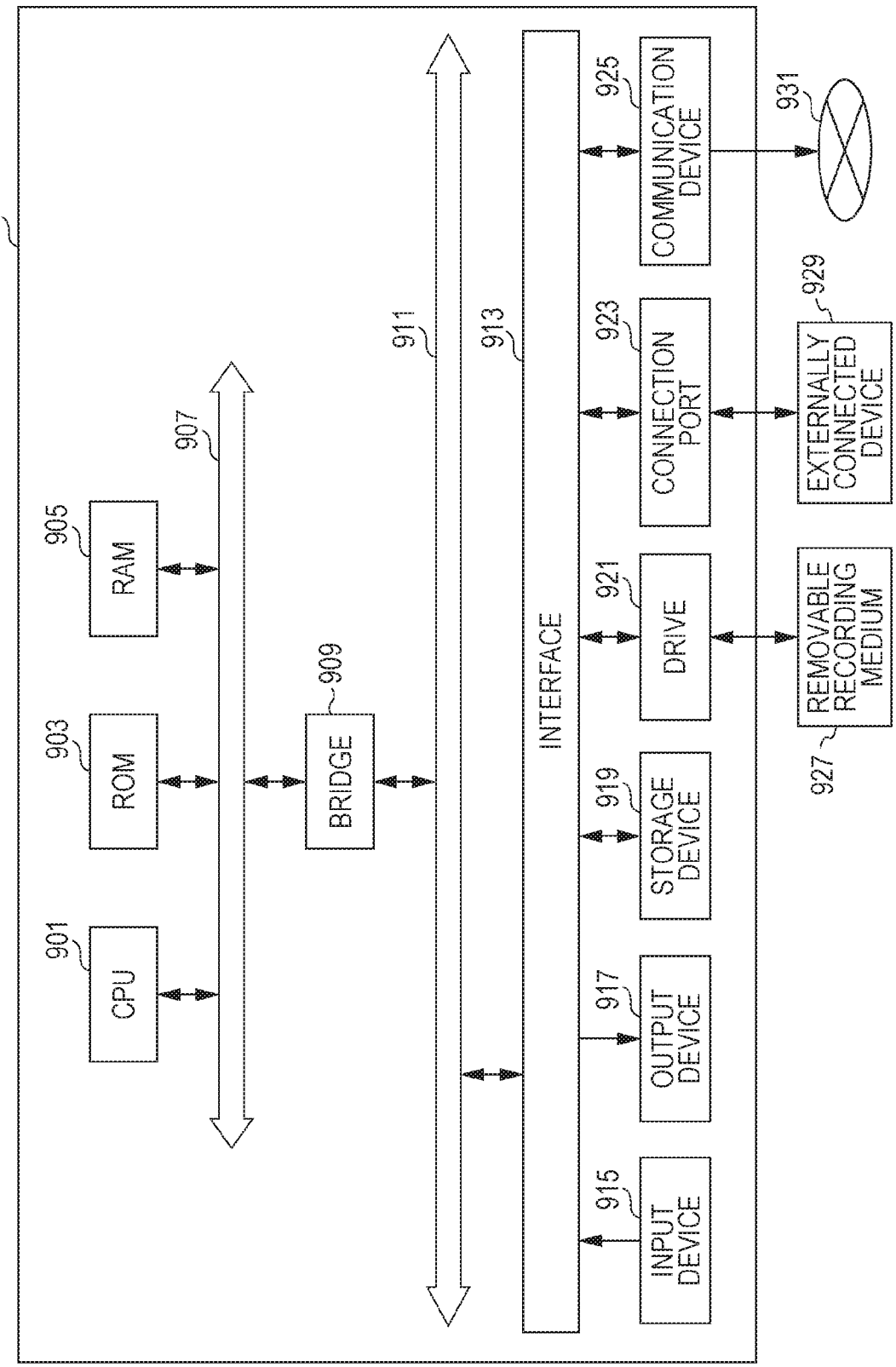
FIG. 13 is a diagram illustrating an exemplary hardware configuration of the issuance server and the transaction server according to the embodiment of the present disclosure.

Hereinafter, hardware configurations of the issuance server 100 and the transaction server 300 according to the embodiment of the present disclosure will be described in detail with reference to FIG. 13. FIG. 13 is a block diagram for illustrating the hardware configurations of the issuance server 100 and the transaction server 300 according to the embodiment of the present disclosure.

The issuance server 100 and the transaction server 300 mainly include a CPU 901, a ROM 903, and a RAM 905. Moreover, the transaction server 300 further includes a host bus 907, a bridge 909, an external bus 911, an interface 913, an input device 915, an output device 917, a storage device 919, a drive 921, a connection port 923, and a communication device 925.

The CPU 901 functions as a main processing unit and a control unit, and controls overall operation in the issuance server 100 and the transaction server 300 or a part thereof in accordance with various programs recorded in the ROM 903, the RAM 905, the storage device 919, or a removable recording medium 927. Note that the CPU 901 may have the functions of the processors 102 and 302. The ROM 903 stores programs to be used by the CPU 901, operation parameters, and the like. The RAM 905 primarily stores programs to be used by the CPU 901, parameters that appropriately change in the execution of the programs, and the like. These are mutually connected by the host bus 907 including an internal bus such as a CPU bus.

The input device 915 is an operation means operated by the user, such as a mouse, a keyboard, a touch panel, a button, a switch, and a lever, for example. In addition, the input device 915 includes, for example, an input control circuit or the like that generates input signals on the basis of information input by the user using the operation means mentioned above, and outputs the signals to the CPU 901. The user can input various kinds of data or provide an instruction for processing operation to the issuance server 100 and the transaction server 300 by operating the input device 915.

The output device 917 includes a device capable of visually or aurally notifying the user of the obtained information. Examples of such a device include a display device, such as a CRT display device, a liquid crystal display device, a plasma display device, an EL display device, and a lamp, an audio output device, such as a speaker and a headphone, a printer, a mobile phone, a facsimile, and the like. The output device 917 outputs, for example, results obtained through various kinds of processing performed by the issuance server 100 and the transaction server 300. specifically, the display device displays the results obtained through various kinds of processing performed by the issuance server 100 and the transaction server 300 as text or images. Meanwhile, the audio output device converts audio signals including reproduced audio data, sound data, and the like into analog signals, and outputs them.

The storage device 919 is a device for storing data, which is an example of the storages 106 and 306 of the issuance server 100 and the transaction server 300. The storage device 919 includes, for example, a magnetic storage device such as a hard disk drive (HDD), a semiconductor storage device, an optical storage device, a magneto-optical storage device, or the like. The storage device 919 stores programs to be executed by the CPU 901, various kinds of data, various kinds of data obtained from the outside, and the like. Note that the storage device 919 may have the functions of the storages 106 and 306.

The drive 921 is a reader/writer for a recording medium, which is incorporated in or externally attached to the issuance server 100 and the transaction server 300. The drive 921 reads out information recorded in the attached removable recording medium 927, such as a magnetic disk, an optical disk, a magneto-optical disk, and a semiconductor memory, and outputs the information to the RAM 905. Furthermore, the drive 921 is also capable of writing a record in the attached removable recording medium 927, such as a magnetic disk, an optical disk, a magneto-optical disk, and a semiconductor memory. The removable recording medium 927 is, for example, a DVD medium, an HD-DVD medium, a Blu-ray (registered trademark) medium, or the like. Furthermore, the removable recording medium 927 may be a CompactFlash (CF) (registered trademark), a flash memory, a secure digital (SD) memory card, or the like. Furthermore, the removable recording medium 927 may be, for example, an integrated circuit (IC) card mounting a contactless IC chip, an electronic device, or the like.

The connection port 923 is a port for directly connecting a device to the issuance server 100 and the transaction server 300. Examples of the connection port 923 include a universal serial bus (USB) port, an IEEE 1394 port, and a small computer system interface (SCSI) port. Other examples of the connection port 923 include an RS-232C port, an optical audio terminal, and a high-definition multimedia interface (HDMI) (registered trademark) port. By connecting an externally connected device 929 to the connection port 923, the transaction server 300 directly obtains various kinds of data from the externally connected device 929, or provides various kinds of data to the externally connected device 929.

The communication device 925 is, for example, a communication interface including a communication device or the like for connecting to a communication network 931. The communication device 925 is, for example, a communication card for wireless USB (WUSB), a wired or wireless local area network (LAN), or the like. Furthermore, the communication device 925 may be a router for optical communication, a router for asymmetric digital subscriber line (ADSL), a modem for various kinds of communication, or the like. For example, the communication device 925 is capable of transmitting and receiving signals or the like in accordance with a predetermined protocol, such as TCP/IP, for example, with the Internet or another communication device. Furthermore, the communication network 931 to be connected to the communication device 925 includes a network connected by wire or wirelessly, or the like, which may be, for example, the Internet, a home LAN, infrared communication, radio wave communication, satellite communication, or the like.

6. SUPPLEMENTARY ITEMS

As described above, although the preferred embodiments of the present disclosure have been described in detail with reference to the accompanying drawings, the technical scope of the present disclosure is not limited to such examples. It is apparent to those skilled in the art of the present disclosure that various alterations and modifications can be conceived within the scope of the technical idea described in the appended claims, and such alterations and modifications are also naturally within the technical scope of the present disclosure.

For example, in the example described above, the transaction request is transmitted from the user device 200 owned by the user having the learning unit to the transaction server 300. However, the transaction request may be transmitted from an information processing apparatus owned by a store that sells products or the like. At this time, the information processing apparatus owned by the store that sells products or the like may transmit, to the transaction server 300, location information indicating the location at which the information processing apparatus is installed.

Furthermore, in the example described above, information associated with the educational coin and the transaction is managed by blockchain data. However, the information associated with the educational coin and the transaction may be managed by a system other than the blockchain. For example, the information associated with the educational coin and the transaction may be managed by a server group constructing a cloud system. Furthermore, the information associated with the educational coin and the transaction may be managed by an existing P2P network.

Furthermore, there may be provided a computer program that causes the processor 102 of the issuance server 100 and the processor 302 of the transaction server 300 to operate as described above with reference to FIGS. 9 and 11. Furthermore, a recording medium storing such a program may be provided.

7. CONCLUSION

As described above, in the asset management system according to the present disclosure, exchange is carried out between the educational coin and the exchange coin on the basis of a predetermined condition. Accordingly, for example, an organization in an area (e.g., company, store, and public organization) can motivate educated human resources to visit the area.

Furthermore, in the asset management system according to the present disclosure, information associated with the educational coin and the exchange coin is managed by the blockchain that is an example of the P2P database. Accordingly, the information associated with the educational coin and the transaction is held on the network without being tampered. Furthermore, a third party who wishes to use the information included in the blockchain can access the information included in the blockchain on the basis of predetermined authority.

Note that the following configurations are also within the technical scope of the present disclosure.

(1)

An information processing apparatus, including: a processor that determines, on the basis of a predetermined condition, a transaction between a first virtual asset granted on the basis of a learning unit being certified to a user being educated and a second virtual asset different from the first virtual asset.

(2)

The information processing apparatus according to (1) described above, in which the processor determines an exchange rate between the first virtual asset and the second virtual asset on the basis of the predetermined condition.

(3)

The information processing apparatus according to (2) described above, in which the predetermined condition is a condition related to a location, and the exchange rate is set for each location.

(4)

The information processing apparatus according to (3) described above, in which the exchange rate is set for each area.

(5)

The information processing apparatus according to (3) described above, in which the processor is configured to:

obtain location information from a user device owned by the user; and determine the exchange rate between the first virtual asset and the second virtual asset on the basis of the location information and the exchange rate set for each location.

(6)

The information processing apparatus according to any one of (1) to (5) described above, in which the processor determines an exchange rate between the first virtual asset and the second virtual asset according to a grade of the user at a time when the learning unit is certified.

(7)

The information processing apparatus according to (6) described above, in which the exchange rate is set higher as the grade is better.

(8)

The information processing apparatus according to any one of (1) to (7) described above, in which the predetermined condition is that there is relevance between the learning unit or a topic associated with the learning unit and a product or a service that the user wishes to purchase, and the processor determines whether or not the transaction is permissible according to presence or absence of the relevance.

(9)

The information processing apparatus according to any one of (1) to (7) described above, in which the predetermined condition is that there is relevance between the learning unit or a topic associated with the learning unit and a product or a service that the user wishes to purchase, and the processor determines an exchange rate between the first virtual asset and the second virtual asset according to presence or absence of the relevance.

(10)

The information processing apparatus according to any one of (1) to (9) described above, in which the predetermined condition is a condition related to a sales entity of a product or a service that the user wishes to purchase, and the processor determines whether or not the transaction is permissible on the basis of information associated with the sales entity.

(11)

The information processing apparatus according to any one of (1) to (9) described above, in which the predetermined condition is a condition related to a sales entity of a product or a service that the user wishes to purchase, and the processor determines an exchange rate between the first virtual asset and the second virtual asset on the basis of information associated with the sales entity.

(12)

The information processing apparatus according to any one of (1) to (11) described above, in which the second virtual asset is used for a specific application purpose.

(13)

The information processing apparatus according to any one of (1) to (12) described above, in which the processor registers information associated with the transaction between the first virtual asset and the second virtual asset in a P2P database.

(14)

The information processing apparatus according to (13) described above, in which the P2P database is a blockchain.

(15)

A method for processing information that causes a computer to determine, on the basis of a predetermined condition, a transaction between a first virtual asset granted on the basis of a learning unit being certified to a user being educated and a second virtual asset different from the first virtual asset.

REFERENCE SIGNS LIST

100 Issuance server
102 Processor
104 Communication unit
106 Storage
108 Certification unit
110 Issuing unit
112 Registration unit
200 User device
202 Processor
204 Communication unit
206 Operation unit
208 Display
210 Location information acquisition unit
212 Acquisition unit
300 Transaction server
302 Processor
304 Communication unit
306 Storage
308 Acquisition unit
310 Determiner
312 Registration unit
400 Network

The invention claimed is:

1. An information processing apparatus, comprising:
a peer-to-peer (P2P) database configured to:
store transaction information, associated with a first virtual asset, comprising at least one of registration information of a user, a learning unit obtained by the user, the first virtual asset certified to the user upon completion of the learning unit, at least one transaction associated with one of an exchange or a sale of the first virtual asset, or an exchange rate set for each location of at least one location;
a processor configured to:
receive a transaction request from a user device associated with the user, wherein
the transaction request includes a request for the exchange of the first virtual asset with a second virtual asset to purchase one of a product or a service, and
the second virtual asset is different from the first virtual asset;
determine a relevance between one of the learning unit or a topic associated with the learning unit and one of the product or the service to be purchased;
obtain a location of the at least one location of the user from the user device;
determine, based on at least one of the location or the transaction information, a condition for estimation of a value of an exchange rate for the exchange of the first virtual asset with the second virtual asset;

determine the value of the exchange rate between the first virtual asset and the second virtual asset based on the condition and the exchange rate set for the location of the user;

determine, based on one of a presence or an absence of the relevance between one of the learning unit or the topic associated with the learning unit and one of the product or the service to be purchased, whether to permit a transaction between the first virtual asset and the second virtual asset to purchase one of the product or the service, wherein the transaction is permitted at the determined value of the exchange rate; and update the transaction information associated with the user based on the transaction between the first virtual asset and the second virtual asset.

2. The information processing apparatus according to claim 1, wherein the exchange rate is set for each area of the at least one location.

3. The information processing apparatus according to claim 1, wherein the processor is further configured to determine the exchange rate between the first virtual asset and the second virtual asset based on a grade of the user at a time when the learning unit is certified.

4. The information processing apparatus according to claim 3, wherein
a first exchange rate associated with a first grade is set higher than a second exchange rate associated with a second grade, and
the first grade is better than the second grade.

5. The information processing apparatus according to claim 1, wherein
the condition is associated with the relevance between one of the learning unit or the topic associated with the learning unit and one of the product or the service that the user wishes to purchase, and
the processor is further configured to determine the exchange rate between the first virtual asset and the second virtual asset based on the presence or the absence of the relevance.

6. The information processing apparatus according to claim 1, wherein
the condition is associated with a sales entity of one of the product or the service that the user wishes to purchase, and
the processor is further configured to determine whether or not the transaction is permissible based on information associated with the sales entity.

7. The information processing apparatus according to claim 1, wherein
the condition is associated with a sales entity of one of the product or the service that the user wishes to purchase, and
the processor is further configured to determine the exchange rate between the first virtual asset and the second virtual asset based on information associated with the sales entity.

8. The information processing apparatus according to claim 1, wherein the second virtual asset is used for an application purpose.

9. The information processing apparatus according to claim 1, wherein the processor is further configured to register information associated with the transaction between the first virtual asset and the second virtual asset in the P2P database.

10. The information processing apparatus according to claim 1, wherein the P2P database is a blockchain.

11. The information processing apparatus according to claim 1, wherein the stored transaction information has an electronic signature by use of a private key of the user.

12. A method, comprising:
storing, in a peer-to-peer (P2P) database, transaction information, associated with a first virtual asset, comprising at least one of registration information of a user, a learning unit obtained by the user, the first virtual asset certified to the user upon completion of the learning unit, at least one transaction associated with one of an exchange or a sale of the first virtual asset, or an exchange rate set for each location of at least one location;
receiving a transaction request from a user device associated with the user, wherein
the transaction request includes a request for the exchange of the first virtual asset with a second virtual asset to purchase one of a product or a service, and
the second virtual asset is different from the first virtual asset;
determining a relevance between one of the learning unit or a topic associated with the learning unit and one of the product or the service to be purchased;
obtaining a location of the at least one location of the user from the user device;
determining, based on at least one of the location or the transaction information, a condition for estimation of a value of an exchange rate for the exchange of the first virtual asset with the second virtual asset;
determining the value of the exchange rate between the first virtual asset and the second virtual asset based on the condition and the exchange rate set for the location of the user;
determining, based on one of a presence or an absence of the relevance between one of the learning unit or the topic associated with the learning unit and one of the product or the service to be purchased, whether to permit a transaction between the first virtual asset and the second virtual asset to purchase one of the product or the service, wherein the transaction is permitted at the determined value of the exchange rate; and
updating the transaction information based on the transaction between the first virtual asset and the second virtual asset.

* * * * *